(12) United States Patent
Clark et al.

(10) Patent No.: US 9,964,265 B2
(45) Date of Patent: May 8, 2018

(54) LIGHT EMITTING DIODE LUMINAIRE DEVICE AND SYSTEM WITH COLOR TEMPERATURE TUNNING

(71) Applicant: FINELITE INC., Union City, CA (US)

(72) Inventors: Walter Blue Clark, Palo Alto, CA (US); Johannes Dale Toale, San Jose, CA (US); Aaron Matthew Smith, Fremont, CA (US); Stephen Anthony Radovich, Castro Valley, CA (US)

(73) Assignee: FINELITE INC., Union City, CA (US)

( * ) Notice: Subject to any disclaimer, the term of this patent is extended or adjusted under 35 U.S.C. 154(b) by 0 days. days.

(21) Appl. No.: 15/732,285

(22) Filed: Oct. 19, 2017

(65) Prior Publication Data

US 2018/0066816 A1     Mar. 8, 2018

Related U.S. Application Data

(63) Continuation-in-part of application No. 15/731,236, filed on May 8, 2017, now Pat. No. 9,807,845, which
(Continued)

(51) Int. Cl.
*H05B 39/00* (2006.01)
*F21S 2/00* (2016.01)
(Continued)

(52) U.S. Cl.
CPC .............. *F21S 2/005* (2013.01); *F21S 8/033* (2013.01); *F21S 8/046* (2013.01); *F21S 8/061* (2013.01); *F21V 5/04* (2013.01); *F21V 19/003* (2013.01); *H05B 33/0854* (2013.01); *H05B 33/0863* (2013.01); *H05B 33/0872* (2013.01); *H05B 37/0218* (2013.01); *H05B 37/0227* (2013.01); *H05B 37/0272* (2013.01); *F21V 23/02* (2013.01); *F21V 23/06* (2013.01)

(58) Field of Classification Search
CPC ............ H05B 33/0815; H05B 33/0818; H05B 41/2828; H05B 41/3921; H05B 41/3927; H05B 41/28; H05B 37/029; H05B 33/0803; H05B 37/0254; H05B 37/02; A41D 27/085; A42B 1/242; G09F 21/02
See application file for complete search history.

(56) References Cited

U.S. PATENT DOCUMENTS

8,915,613 B2 * 12/2014 Clark ................... F21S 2/005
                                                                362/249.01
9,500,353 B2 * 11/2016 Clark ................... F21S 2/005
(Continued)

*Primary Examiner* — Minh D A
(74) *Attorney, Agent, or Firm* — James A. Gavney, Jr.; JAG Patent Services (57) ABSTRACT

A lighting system is disclosed that includes lighting zones. Each of the lighting zones include LED light fixtures with different sets of LED arrays mounted to modular light boards that emit different output spectra. Each of the zones also includes a layer pack control unit coupled to the LED light fixture to control power to the LED light fixtures and to execute or run lighting protocols. The lighting system preferably includes a user interface device coupled to LED light fixtures in each of the light zones through a system bus and is capable independently control light output from the LED light fixtures in each of the zones.

15 Claims, 9 Drawing Sheets

Related U.S. Application Data is a continuation-in-part of application No. 15/330,847, filed on Nov. 8, 2016, now Pat. No. 9,681,516, which is a continuation-in-part of application No. 14/544,020, filed on Nov. 14, 2014, now Pat. No. 9,500,353, which is a continuation-in-part of application No. 13/507,542, filed on Jul. 9, 2012, now Pat. No. 8,915,613.

(60) Provisional application No. 61/689,410, filed on Jun. 6, 2012.

(51) Int. Cl.
| | |
|---|---|
| *F21S 8/00* | (2006.01) |
| *H05B 33/08* | (2006.01) |
| *F21S 8/04* | (2006.01) |
| *F21S 8/06* | (2006.01) |
| *F21V 19/00* | (2006.01) |
| *H05B 37/02* | (2006.01) |
| *F21V 5/04* | (2006.01) |
| *F21V 23/02* | (2006.01) |
| *F21V 23/06* | (2006.01) |

(56) References Cited

U.S. PATENT DOCUMENTS

| | | | |
|---|---|---|---|
| 9,807,845 B2 * | 10/2017 | Clark | H05B 33/0863 |
| 2012/0086345 A1 * | 4/2012 | Tran | F24F 11/0009 |
| | | | 315/158 |

* cited by examiner

LIGHT EMITTING DIODE LUMINAIRE DEVICE AND SYSTEM WITH COLOR TEMPERATURE TUNNING

RELATED APPLICATION

This application is a continuation-in-part of co-pending U.S. patent application Ser. No. 15/731,236, filed on May 8, 2017, and titled LIGHT EMITTING DIODE LUMINAIRE DEVICE AND SYSTEM WITH COLOR TEMPERATURE TUNNING" which is a continuation-in-part of U.S. patent application Ser. No. 15/330,847, filed on Nov. 8, 2016, and titled LIGHT EMITTING DIODE LUMINAIRE DEVICE AND SYSTEM WITH COLOR TEMPERATURE TUNNING", now U.S. Pat. No. 9,681,516, which is a continuation-in-part of U.S. patent application Ser. No. 14/544,020, filed on Nov. 14, 2014, and titled "LIGHT EMITTING DIODE LUMINAIRE DEVICE AND SYSTEM", now U.S. Pat. No. 9,500,353, which is a continuation-in-part of U.S. patent application Ser. No. 13/507,542, filed on Jul. 9, 2012, and titled "LIGHT EMITTING DIODE LUMINAIRE DEVICE AND SYSTEM", now U.S. Pat. No. 8,915,613, which claims priority under 35 U.S.C. § 119(e) from the co-pending U.S. provisional patent application Ser. No. 61/689,410, filed on Jun. 6, 2012, and titled "LUMINAIRE DEVICE AND SYSTEM."

The U.S. patent application Ser. No. 15/731,236, filed on May 8, 2017, and titled LIGHT EMITTING DIODE LUMINAIRE DEVICE AND SYSTEM WITH COLOR TEMPERATURE TUNNING", the U.S. Pat. No. 9,681,516, the U.S. Pat. No. 9,500,353, U.S. Pat. No. 8,915,613, and the provisional patent application Ser. No. 61/689,410, filed on Jun. 6, 2012, and titled "LUMINAIRE DEVICE AND SYSTEM" are all hereby incorporated by reference.

FIELD OF THE INVENTION

This invention relates to lighting systems. More specifically, this invention relates to Light Emitting Diode (LED) devices and systems with white light color temperature tunning.

BACKGROUND OF THE INVENTION

A light-emitting diode (LED) is a semiconductor diode that emits light when an electrical current is applied in the forward direction of the device, such as in a simple LED circuit.

The device is fabricated from layers of silicon and seeded with atoms of phosphorus, germanium, arsenic or other rare-earth elements. The layers of the device are called the die and the junction between the materials is where the light is generated. The electricity enters from one side of the die and exits out the other. As the current passes through the LED device, the materials that makes up the junction react and light is emitted.

LEDs are widely used as indicator lights on electronic devices and increasingly in higher power applications such as flashlights and area lighting. A LED is usually a small area (less than 1 $mm^2$) light source, often with optics added to the chip to shape its radiation pattern and assist in reflection. The color of the emitted light depends on the composition and condition of the semiconducting material used, and can be infrared, visible, or ultraviolet.

Combining red, green, and blue light-emitting diodes in the appropriate way allows lighting engineers to match the soft white light of incandescent bulbs. Also, combining red, green, and blue light-emitting diodes can be used to create other color light outputs or dynamic color light outputs for scores boards, advertisement boards and the like.

Because low cost white light emitting diodes are now available, blending or mixing of color LEDs for commercial or residential lighting application has largely been replaced with white light emitting diodes. White light emitting diodes are often characterized by a color temperature scale. The color temperature of any light source is the temperature of an ideal black-body radiator that radiates light of comparable hue to that of the light source. White light emitting LED's generally do not emit purely white light, but rather they emit a component of pure white light and varying amounts overtone colors. An LED color temperature defines the amount of pure white, yellow, red and blue emitted by the white light emitting diode. Another way to think of an LED color temperature is how 'warm' or 'cool' the light is that is emitted by white light emitting diode. A warmer white light emitting diode emits white light with overtone component of yellow or even red, while a cooler white light emitting diode emits white light with overtone components of blue.

SUMMARY OF THE INVENTION

The present invention is directed to a lighting device. The lighting device includes a first master circuit board with connectors configured to power light emitting diodes. The first master circuit board is coupled to a transformer for converting alternating current to direct current for powering the light emitting diodes. The lighting device further includes a first set of modular light boards with arrays of light emitting diodes. Preferably, the light emitting diodes used in the lighting device of the present invention each use 0.2 watts or less of electrical power. Also, preferably each of the modular light boards within the first set of modular light boards include an array of 20 or more light emitting diodes and upwards of 40 or more light emitting diodes.

In accordance with embodiments of the invention rows with the arrays of light emitting diodes are covered by or embedded within an elongated curved lens structure. The an elongated curved lens structure acts as a diffuser lens to spread or soften the light that is emitted by light emitting diodes within the arrays.

The first set of modular light boards have matched connectors that detachably and interchangeably couple to the connectors on the first master circuit board. Accordingly, modular light boards are capable of being changed in the event that any one of the modular light boards fails or diodes on any one of the modular light boards fail. Also, modular light boards of the present invention can be added or removed according to the lighting needs of the environment where the lighting device is installed.

The lighting device also includes a housing for holding the first master circuit board and the first set of modular light boards. Preferably, the housing is an elongated housing with a first diffuser lens cover. The first master circuit board is positioned within the elongated housing, such that light emitted from the arrays of light emitting diodes on the first set of modular light boards is emitted through the first diffuser lens cover.

In further embodiment of the invention, the lighting device further comprising aa second master circuit board with connectors configured to power light emitting diodes. The second master circuit board is configured to power and electrically couple to a second set of modular light boards having arrays of light emitting diodes, such as decided above with reference to the first master circuit board. In accordance with this embodiment of the invention the lighting device also includes a second diffuser lens cover coupled to the elongated housing and positioned on an opposed side of the elongated housing relative to the first diffuser lens cover. In operation, the second master circuit board is configured to emit light from the arrays of light emitting diodes on the second set of modular light boards through the second diffuser lens cover.

In yet further embodiments of the invention, the lighting device includes a controller for independently controlling light output from the first set of modular light boards and the second set of modular light boards. Alternatively, or in addition to the control feature described above, the lighting device is configured with a controller for selectively controlling light output from any of the arrays of light emitting diodes on any one of the modular light boards of the first master circuit and the second master circuit.

The interchangeable and modular features of the modular light boards allows for the construction of unique lighting systems that are either suspended from a ceiling or wall and/or that are integrated into a ceiling or wall. In accordance with the embodiments of the invention, the lighting device includes one or more mounting features or hardware for securing the lighting device to a wall or a ceiling. For example, the lighting device includes one or more cable features for mounting to a ceiling, one or more bracket features for mounting to a wall and/or adjustable or fixed flange features for mounting the lighting device recessed within a wall.

In accordance with the embodiments of the invention, the LED light system described above is equipped with an advanced control system and control interface that allows for dimming control and color temperature tuning. Control commands, operational protocols or communication networks in the LED lighting system utilize and number of standards, including Digital Signal Interface (DSI) 0-10 V lighting control signals and formats, Digital Addressable Lighting Interface (DALI) lighting control signals and formats, DMX512 (Digital Multiplex) control signals and formats or a combination thereof.

In accordance with the embodiments of the invention the system includes zones of LED light fixtures; each of the zones of LED light fixtures include one or more LED light fixtures. Each of the LED light fixtures within the system include different sets of LEDs that emit different output spectra that include a component of white light. In operation light emitted from two different sets of LED combine to produce a combined output light intensity and combined output light color temperature. By adjusting the relative intensities of light output from the different sets of LEDs within the light fixtures as well as the total combined intensity of the different sets of LEDs within the light fixtures, the light fixtures are capable of being adjusted to produce selected or target combined output light intensities and selected or target combined output light color temperatures. Preferably, each of the LED light fixtures include a set of LEDs that emit a component of yellow light as well as a component of white light (warm white light) and a different set of LEDs that emit a component of blue light as well as well as a component of white light (cool white light).

The system includes a control unit coupled to the LED light fixtures for controlling power to the LED light fixtures based on control command signals provides from any number of sensors, switches and control interface devices. The sensors preferably include daylight sensors that measure or detect an amount of ambient light, and/or color of ambient light. The daylight sensors provide control signals to the control unit to maintain a target combined output light intensity and the target combined output light color temperature resulting from the combination of light emitted by the light fixtures and light provided from ambient light. Where the sensors include a white light sensor, they system adjusts the total output intensity of the LED light fixtures as wells as the relative intensities of different LEDs within the LED light fixtures to compensate for the presence of white light provided by ambient light. Other sensors include occupancy sensors that adjust light outputs from the LED light fixtures based on presence or people within a vicinity of the LED light fixtures or vicinity of the occupancy sensors.

The control unit include all the necessary electrically components, including a computing unit (CPU) for running software and analyzing control signals received from sensors and control interface devices and connectors for coupling to and for powering the LED light fixtures. In accordance with the embodiments of the invention the control unit includes a wireless transmitter for receiving and processing input control signals from a remote control interface device, such as a smart-phone or computer.

In accordance with the embodiments of the invention a control interface device is a blue-tooth enabled device that has a touch-screen. The control interface device pairs with a blue-tooth transducer coupled to the control unit. The control interface device runs software that generates one or more selectable graphical control interfaces that allows a user to input selected or target output light intensities and selected or target output light color temperatures. Preferably, one of the graphical control interfaces includes movable intersecting cross-hairs. In operation, a user drags or moves positions of the intersecting cross-hairs on the touch-screen of the control interface device to change or adjust the output light intensity and output light color temperature of the LED light fixtures.

In accordance with the method of the invention white light is generated by emitting light from different sets of LEDs of one or more light fixtures that emit different output spectra and that include a component of white light. As described above, the output spectra from the different LEDs combine to produce a combined output light intensity and a combined output light color temperature. In operation a target combined output light intensity and a target combined output light color temperature are selected through a graphical control interface on a control interface device. The control interface device then sends control signals or control commands to the CPU of the control unit and the control unit adjusting the relative intensities and the total combined intensities of light from the different sets of LEDs to reach the selected output light intensity and selected output light color temperature. Preferably, an amount of ambient light is measured or detected using one or more sensors and the control unit compensates or adjusts the output light intensities and the target output light color temperature to include or compensate for the amount of ambient light measure or detected.

DETAILED DESCRIPTION OF THE INVENTION

Figure 1A:
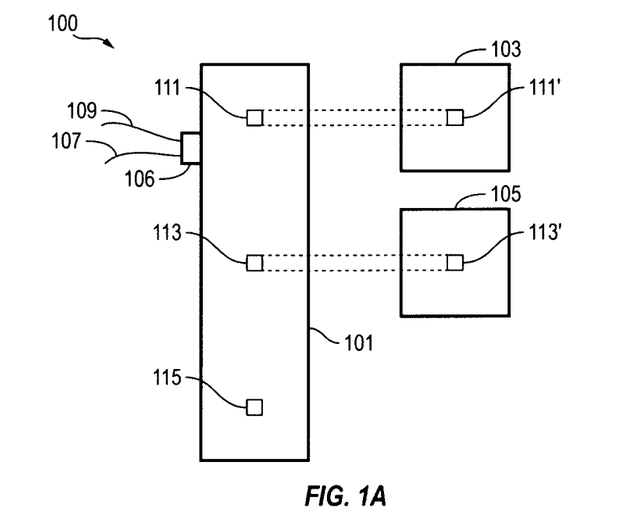
FIG. 1A is a schematic representation of a master circuit board with modular light boards having matched connectors that detachably and interchangeably couple to the connectors on the master circuit board, in accordance with the embodiments of the invention.

FIG. 1A is a schematic representation 100 of a master circuit board 101 with modular light boards 103 and 105 that have matched connectors 111' and 113' that detachably and interchangeably couple to the connectors 111, 113, 115 on the master circuit board 101. The master circuit board 101 includes, or is electrically coupled to, a transformer 106 for converting alternating current from power leads 107 and 109 into direct current for powering light emitting diodes. The master circuit board 101 along with modular light boards 103 and 105 are used in a lighting device such as described in detail below.

Figure 1B:
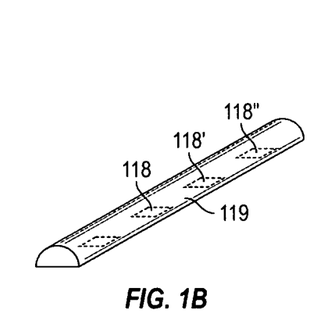
FIG. 1B shows an elongated curved diffusion lens with light emitting diodes are covered by or embedded within the elongated curved diffusion lens, in accordance with the embodiments of the invention.

FIG. 1B shows an elongated curved diffusion lens 119 with light emitting diodes 118, 118' and 118" that are covered by or embedded within the curved diffusion lens 119. Preferably rows of light emitting diodes on modular light boards are covered or embedded within the curved diffusion lens 119, such as described below. The curved diffusion lens 119 is formed from a clear plastic or epoxy material, such as acrylic. The curved diffusion lens 119 spreads or softens the light emitted by the light emitting diodes within the arrays.

Figure 1C:
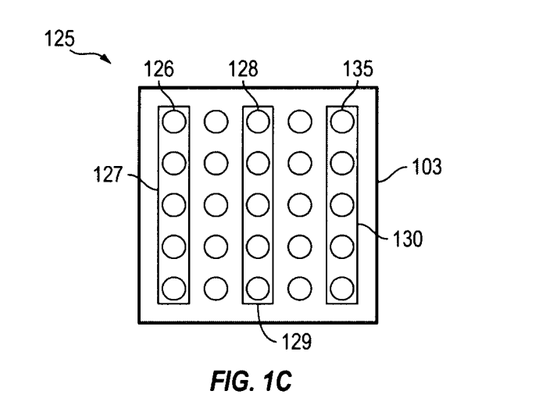
FIG. 1C shows of an array of light emitting diodes on a modular light board that electrically couples to the master circuit board, in accordance with the embodiments of the invention.

FIG. 1C shows a schematic representation 125 of an array of light emitting diodes 126, 128 and 135 on a modular light board 103 that electrically couples to a master circuit board 101 (FIG. 1A). Each of the modular light boards 103 and 105 in the lighting device of the present invention include arrays of light emitting diodes with 20 or more discrete light emitting diodes and upwards of 40 or more discrete light emitting diodes. Preferably, the discrete light emitting diodes used in the lighting device of the present invention each use 0.2 watts or less of electrical power. In accordance with the embodiments of the invention, selected rows of the light emitting diodes 126, 128 and 135 are covered by or embedded within elongated curved diffusion lenses 127, 129 and 130. Alternatively, all of the rows of light emitting diodes on the modular light boards 103 and 105 are covered by or embedded with elongated curved diffusion lenses, such as the elongated curved diffusion lens 119.

The modular light boards 103 and 105 of the lighting device are capable of being individually changed in the event that any one of the modular light boards 103 and 105 fails or diodes on any one of the modular light boards 103 and 105 fails. A lighting device or lighting system of the present invention includes any number of modular light boards and modular light boards can be added or removed according to lighting needs of the environment where the lighting device is installed. Modular light boards 103 and 105 have multiple LED arrays having different corresponding color spectra and/or the modular light boards 103 and 105 each have LED arrays having different corresponding color spectra, such that the color temperature of light emitted can be controlled, such as described in detail below.

Figure 1D:
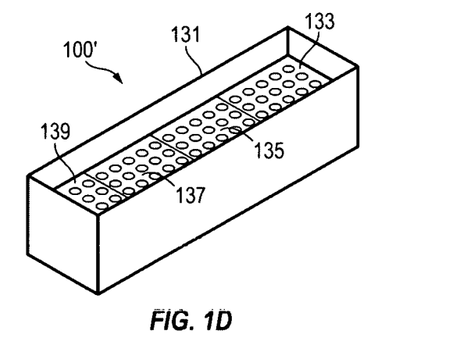
FIG. 1D shows a perspective view of a lighting device with an elongated housing, in accordance with the embodiments of the invention.

FIG. 1D shows a perspective view of a lighting device 100' with an elongated housing 131, in accordance with the embodiments of the invention. The elongated housing 131 is configured for holding one or more master circuit boards each with any number of modular light boards 133, 135, 137 and 139 with each of the modular light boards having arrays of light emitting diodes, such as described above. Preferably, the elongated housing 131 has a diffuser lens cover (not shown) that is positioned in front of the arrays of light emitting diodes or modular light boards 133, 135, 137 and 139 for diffusing light emitted therefrom.

Figure 1E:
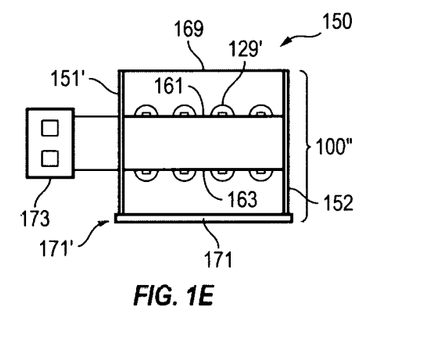
FIG. 1E shows a cross-sectional view of a lighting device with stacked arrays of light emitting diodes for emitting light through opposed sides of a housing structure, in accordance with the embodiments of the invention.
Figure 1F:
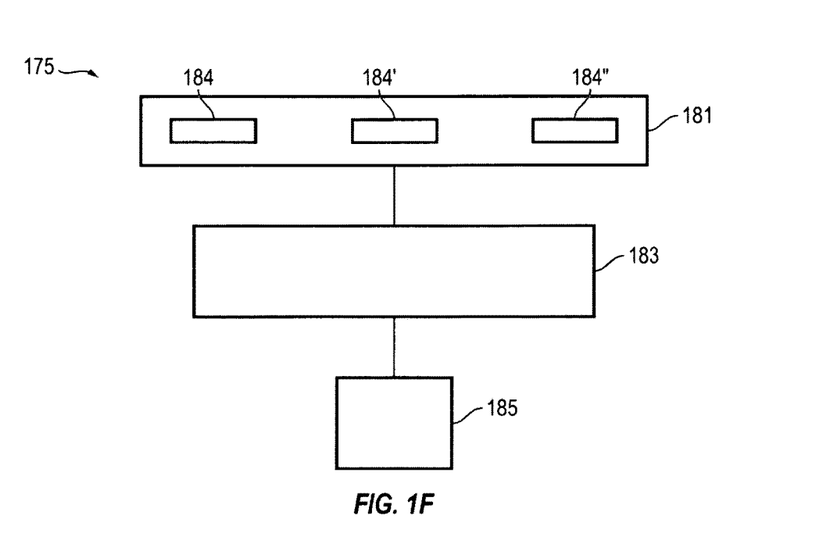
FIG. 1F is a schematic representation of an advanced control lighting system, in accordance with the embodiments of the invention.

FIG. 1E shows a cross-sectional view 150 of a lighting device 100" with stacked arrays of light emitting diodes 161 and 163 for emitting light through opposed sides of a housing structure 151'. The stacked arrays of light emitting diodes 161 and 163 are positioned on any number of modular light boards that are electrically coupled to a respective master circuit through matched connectors, such as described above with reference to FIG. 1A. Each of the master circuit board is electrically coupled to a transformer and any other necessary circuitry for powering the stacked arrays of light emitting diodes 161 and 163 from an alternating current power source (not shown).

Still referring to FIG. 1E, in accordance with the embodiments of the invention the lighting device 100" includes a controller 173. The controller 173 allows for independently controlling light output from each master circuit board, from each modular light boards and/or from each of the stacked arrays of light emitting diodes 161 and 163. The controller includes the appropriate circuitry for executing communication protocols that allow the color temperature of the light output to be adjusted through a user interface, such as described with reference to FIGS. 2A-B.

Preferably, the lighting device 100" includes diffuser lens covers 169 and 171 positioned in front of each of the stacked array of light emitting diodes 161 and 163, respectively. In accordance with further embodiments of the invention one of the diffuser lens covers 171, or both of the diffuser lens covers 169 and 171 extends along a wall portion 152 of the housing 151', such that soft-wash lighting emits from side surfaces 171' of the diffuser lens cover 171 with the array of light emitting diodes 163 powered on. Alternatively to or in addition to the diffuser lens covers 169 and 171, rows of light emitting diodes within the arrays of light emitting diodes 161 and 163 are covered by or embedded within elongated curved diffuser lenses 129'.

Referring to FIG. 1E, a lighting system 175 of the present invention includes an advanced control interface. For example, the lighting system 175 includes light fixture 181 with multiple LED arrays 184, 184' and 184" having different corresponding color spectra $C_1$, $C_2$ and $C_3$. As described above, each of the multiple LED arrays 184, 184' and 184" can include combinations of LEDs having different color spectra $C_1$, $C_2$ and $C_3$. However, for simplicity of explaining operation of the advanced control interface, the LED arrays 184, 184' and 184" are described herein as having a single but different corresponding color spectra $C_1$, $C_2$ and $C_3$. The LED arrays 184, 184' and 184" are mounted on modular light boards that have matched connectors that detachably and interchangeably couple to the connectors on the master circuit board, such as described with reference to FIG. 1A. Also, the LED arrays 184, 184' and 184" can be mounted to provide upward and downward lighting and can include controls for independent upward and downward dimming, such as described above with reference to FIG. 1D.

Preferably each of the LED arrays 184, 184' and 184" emit a component of white light with a component of red, yellow or blue. In other words, the multiple LED arrays 184, 184' and 184" are formed form white LEDs that emit light with varying amounts of cool (higher color temperature) and warm (lower color temperature) white light.

The system also includes a control unit 183 in electrical communication with the light fixture 101. The control unit 183 is configured to independently control the light output intensities $I_1$, $I_2$ and $I_3$ of each of the of the LED arrays 184, 184' and 184", such that light emitted from the LED arrays 184, 184' and 184" combine to give a total light output intensity $I_T$. By varying the relative amounts or percentages of light output light intensities $I_1$, $I_2$ and $I_3$ emitted from each of the LED arrays 184, 184' and 184", the color spectra $C_1$, $C_2$ and $C_3$ combine to produce a total color temperature $C_T$ of the output light emitted by the light fixture 181 is varied. By maintaining relative amounts or percentages of output light $I_1$, $I_2$ and $I_3$ emitted from each of the LED arrays and simultaneously decreasing or increasing the light output light intensities $I_1$, $I_2$ and $I_3$, the total output light intensity $I_T$ emitted from the light fixture is decrease or increased.

The system 175 includes a user interface 185, also referred to herein as a control interface device. The control interface device 185 is either a mechanical control interface device, a touch screen control interface device, a remote wireless control interface device, or a combination thereof. Regardless, the control interface device 185 allows a user to adjust, manipulate, or select both the combined output light intensity from LED arrays 184, 184' and 184" (by changing $I_T$) and the combine output light color temperature from LED arrays 184, 184' and 184" (by changing the relative percentages of $I_1$, $I_2$ and $I_3$ that contribute to $I_T$).

Figure 2A:
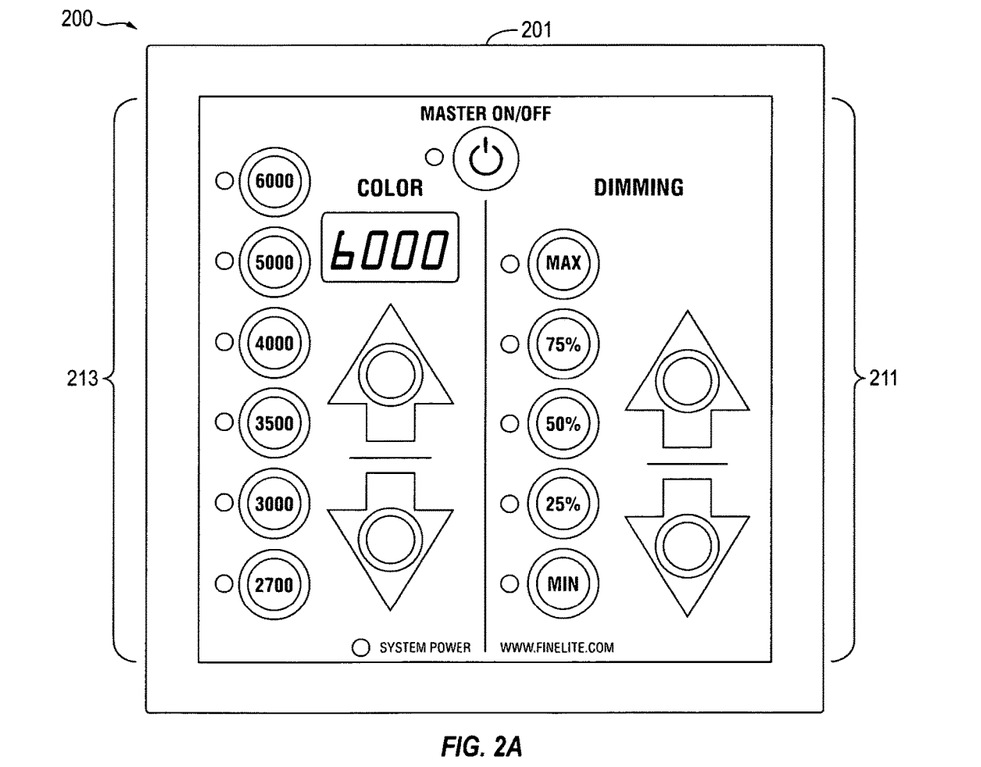
FIG. 2A shows a view of a control interface device for controlling output lighting from an advanced control lighting system, in accordance with the embodiments of the invention.

FIG. 2A shows a view 200 of a control interface device 201 for controlling output lighting from an advanced control lighting system, in accordance with the embodiments of the invention. The control interface device 201 is divided into two control zones 211 and 213. In the control zone 211, a user can select a total light output intensity $I_T$ from a set of LED light fixtures within the lighting system, that include LED fixtures similar to the LED light fixture 181 described with reference to FIG. 1E. The total light output intensity $I_T$ is selected by touching a set buttons or by toggling up or down using arrows within the control zone 211. In the control zone 213, a user can select a total color temperature $C_T$ from a set of LED light fixtures within the lighting system, that include LED fixtures similar to the LED light fixture 181 described with reference to FIG. 1E. The total color temperature $C_T$ is selected by touching a set buttons or by toggling up or down using arrows within the control zone 213. The control interface device 201 is portable, or mounted to a wall and preferably includes a master on and off switch for turning on and off a set or sets of LED light fixtures within the lighting system that are assigned to the control interface device 201.

Figure 2B:
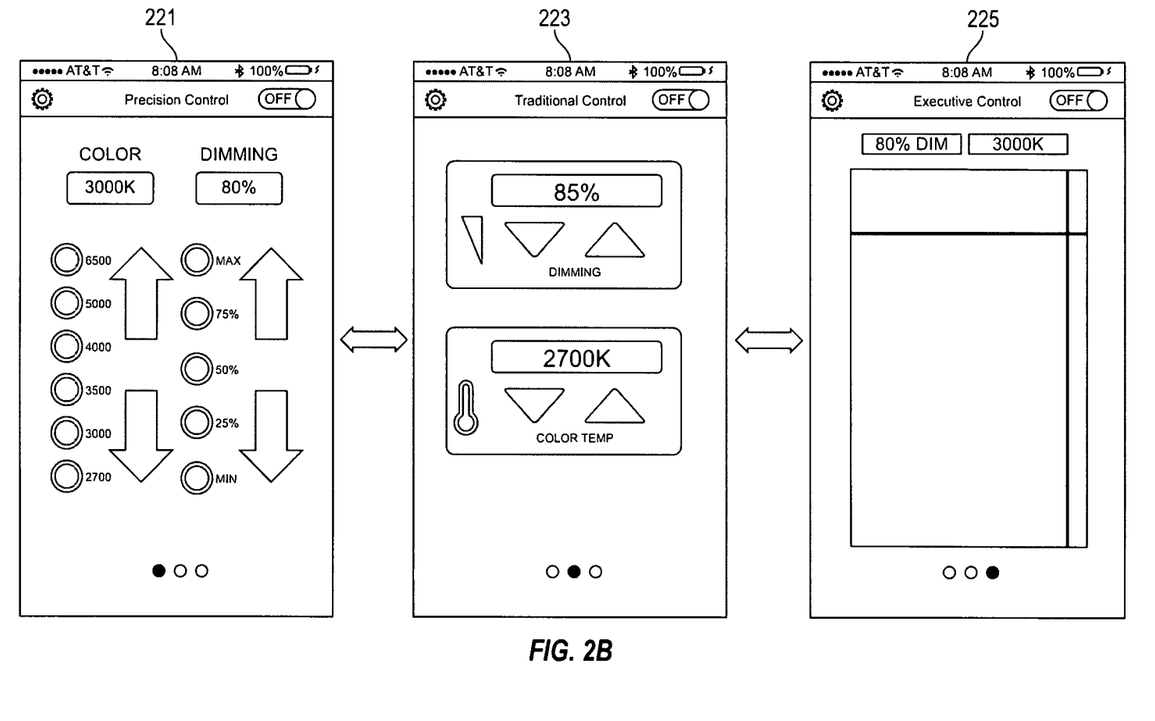
FIG. 2B shows selectable graphical control interfaces operable from a remote control interface device for controlling output lighting from an advanced control lighting system, in accordance with the embodiments of the invention.

Referring to FIG. 2B, in accordance with the embodiments of the invention a control interface device is a Bluetooth enabled control interface device that has a touch screen, such as a smart-phone or a computer. In operation, the Bluetooth enabled control interface device "pairs" with a Bluetooth transducer coupled to the control unit 183 (FIG. 1E). The Bluetooth enabled control interface device runs software that generates one or more selectable graphical control interfaces 221, 223 and 225, such as shown in FIG. 2B. The graphical control interfaces 221, 223 and 225 allow a user to select or input target output light intensities and select or input target output light color temperatures. The graphical control interfaces 221 and 223 are both divided into two control zones, 221 being divided into two vertical control zones and 223 being divided in two horizontal control zones. As described above with reference to FIG. 2A, graphical control interfaces 221 and 223 include one control zone for selecting or adjusting a total light output $I_T$ from a set of light fixtures within the lighting system and one control zone for selecting or adjusting a total color temperature $C_T$ from the set of light fixtures within the lighting system. Preferably, one of the selectable graphical control interfaces 225 includes movable intersecting cross-hairs. In operation, a user drags or moves positions of the intersecting cross-hairs on the touch screen of the Bluetooth enabled control interface device to select a total light output $I_T$ from the set of light fixtures within the lighting system and a total color temperature $C_T$ from the set of light fixtures within the lighting system either individually or simultaneously.

Figure 2C:
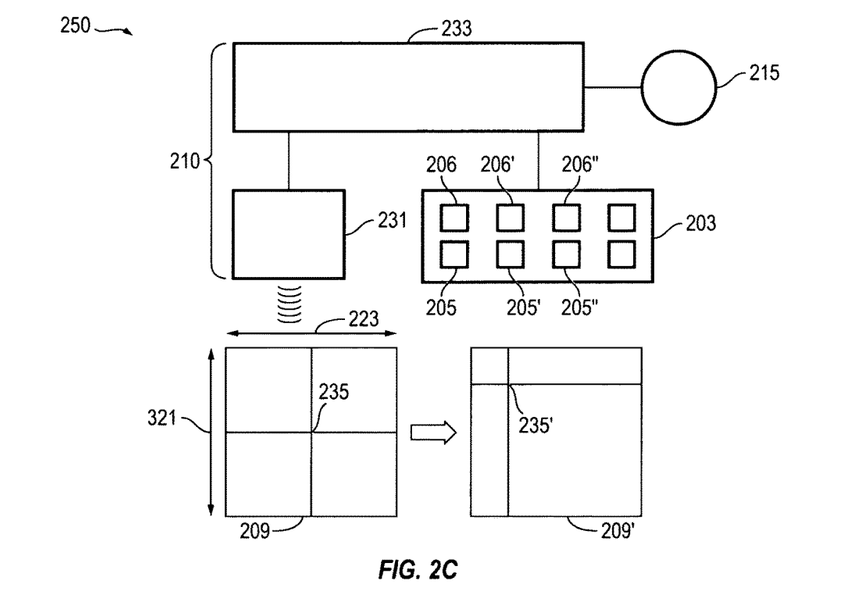
FIG. 2C shows a schematic representation of an advanced control lighting system with a wireless transducer for receiving and processing input control command signals from a remote control interface device, in accordance with the embodiments of the invention.

FIG. 2C shows a schematic representation 250 of an advanced control lighting system 210 with a wireless transducer 210 for receiving and processing input control signals from a remote control interface control device and/or transmitting system status signals to the a remote control interface device (not shown), such as a smart-phone or a computer. The system 210 includes a set of LED light fixtures. Each of the LED light fixtures within the set of LED light fixtures 201 includes at least two different sets of LEDs 205/206, 205'/206' and 205"/206" that emit different output spectra. The LEDs 205/206, 205'/206' and 205"/206" are mounted on modular light boards that have matched connectors that detachably and interchangeably couple to the connectors on the master circuit board, such as described with reference to FIG. 1A. Also, the LEDs 205/206, 205'/206' and 205"/206" can be mounted to provide upward and downward lighting and can include controls for independent upward and downward dimming, such as described above with reference to FIG. 1D The system further includes a control unit 233. The control unit 233 includes all the necessary electrically components, including one or more computing units (CPUs) for running software and analyzing control signals received from sensors 215 and control interface devices and connectors for coupling to and for powering the set of LED light fixtures 203. The sensors 215 can include any number of sensors including but not limited to light sensors for measuring ambient light and/or measuring and calibrating light outputs from the set of light fixtures 203 and motion or occupancy sensors. Preferably, at one of the sensors 215 is used to measure and calibrate light outputs from set of light fixtures 203 such that a selected or target output light intensity and selected or target output light color temperature is maintained. In operation the light sensor measures white light from ambient light. The light sensor send the appropriate control command signals to control unit 213 and the control unit 213 adjusts the total output intensity of from the set of LED light fixtures 203 as wells as the relative intensities of different LEDs 205/206, 205'/206' and 205"/206" within the set LED light fixtures 203 to compensate for white light provided by the ambient light.

Still referring to FIG. 2C, in a preferred embodiment of the invention the lighting system 210 includes a Bluetooth transmitter 231 that allows a user to "pair" a Bluetooth enabled wireless remote control interface device, such as a smart-phone or computer, with the lighting system 210. Preferably, the Bluetooth enabled wireless remote control interface device includes a touch screen and is capable of running application software to display a graphical control interface (FIG. 2B) that includes movable and intersecting cross-hairs, such as described above. The axis 321 on the graphical control interface 225 (FIG. 2B) can, for example, represent output light intensity and the axis 223 on the graphical control interface 225 (FIG. 2B) can, for example, represent output light color temperature. By moving the cross-hairs to different locations 235 and 235' within the frame of touch screen of the blue-tooth enabled wireless remote control interface device, the light outputs from the set of light fixtures 203 are adjusted to new output light intensities and new output light color temperatures. For example, the graphical representation 209' corresponds to a lower light output intensity and cooler output light color that the corresponding to the graphical representation 209.

Figure 3A:
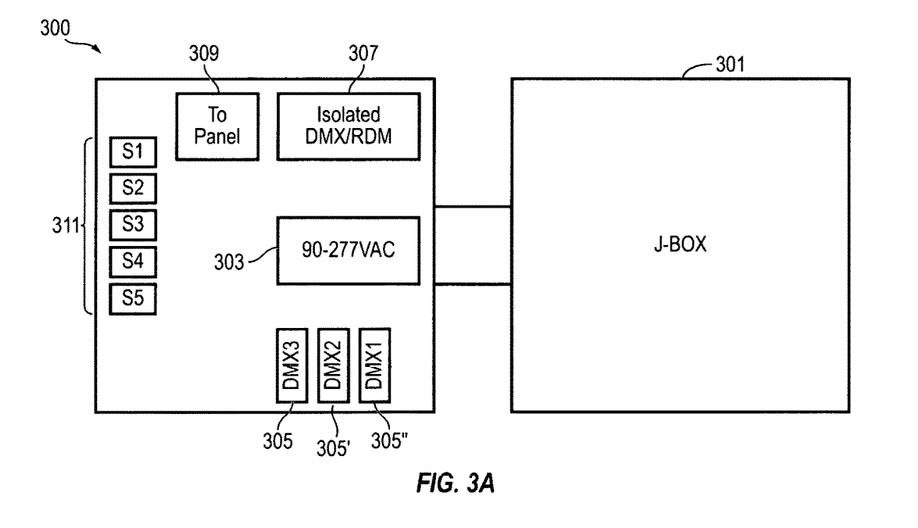
FIG. 3A shows schematic representation of a power control center for powering an advanced control lighting system of the present invention.
Figure 3B:
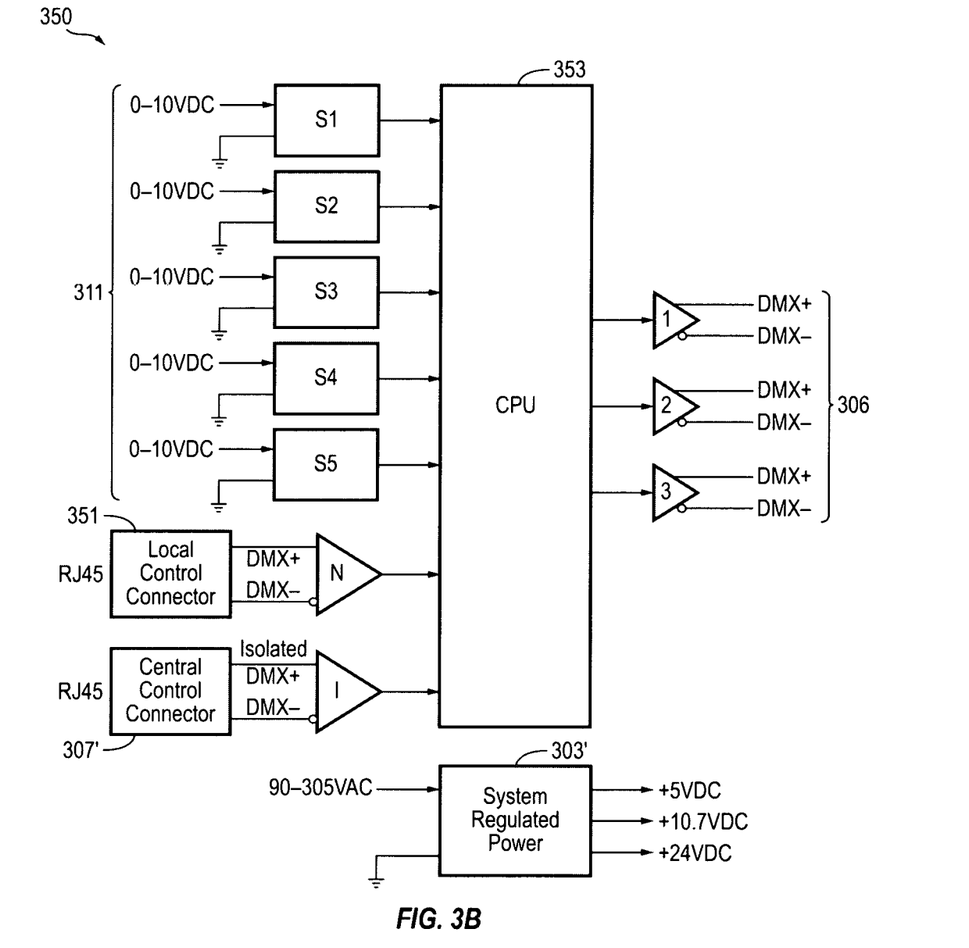
FIG. 3B shows a schematic representation of signals control center for controlling an advanced control lighting system of the present invention.

Referring now to FIG. 3A showing a power control center 300 and FIG. 3B showing a signal control center 350 for powering and controlling the advanced control lighting system of the present invention. The power control center 300 includes a junction box 301 that provides power to a power supply 303. The power control center 300 includes a panel 309 that powers a local control connector 351 of the signal control center 350 and an isolated DMX/RMX 307 that powers a central control connector 307') of the signal control center 350 through a regulated power source 303'. The power control center 300 also provides power for a set of sensors 311 in communication with a control center CPU 353 of the signals control center 350. The power control center 300 also provided power to a set master DMX output connectors 306 through DMX connectors 305, 305' and 305" and the regulated power source 303'.

In operation, the signal control center CPU 353 receives control command signals from the local control connector 351, the central control connector 307' and the set of sensors 311. Based on the control command signals the signal control center CPU will adjust the output signals to the set master DMX output connectors 306 that control LED light fixtures in the system of the present invention.

Figure 4:
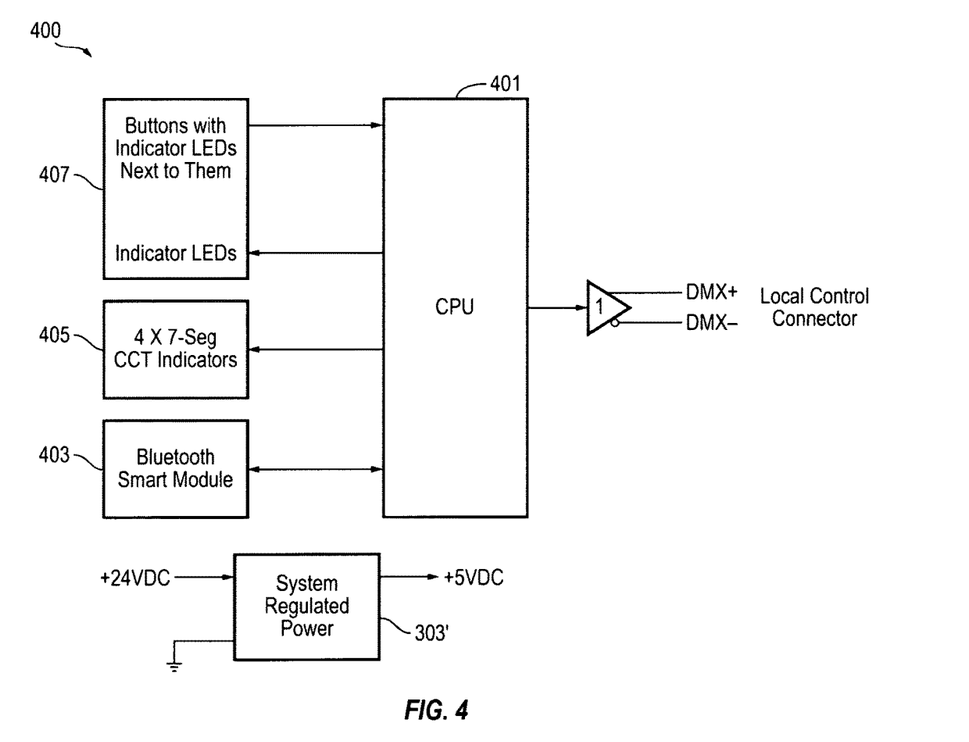
FIG. 4 shows a schematic representation of a user control interface for inputting control command signals and controlling an advanced control lighting system, in accordance with the embodiments of the invention.

FIG. 4 shows a schematic representation of a user control interface 400 powered by a regulated power source 303' and configured for controlling the advanced control lighting system, in accordance with the embodiments of the invention. The user control interface 400 can include an control interface 407 that is coupled to an control interface device 185 (FIG. 1E). The control interface includes button or switch contacts for selecting output light intensities and selecting output light color temperatures, such as described above. The control interface 400 can also include LED indicators to show values of output light intensities and output light color temperatures that have been selected through the buttons or switches of a control interface device 185 (FIG. 1E). The user control interface 400 also includes indicators 405, such as color corrected temperature indicators, that provide an indication of a status of the LED light fixtures within the system that are assigned to the user control interface 400. The user control interface 400 also preferably includes a bluetooth module 403 that allows advanced control lighting system to be control by bluetooth enabled wireless remote control device, such as described with reference to FIG. 2C above and FIG. 5 below. In operation, control command signals are input through the user control interface 400 from the control interface 407, via control interface device 105, or the bluetooth module 403, via bluetooth enabled wireless remote control device. The control command signals are processed by a control interface CPU 401 and an output control signals are transmitted to the local control connector 351 (FIG. 3B) and LED light fixtures assigned to the user control interface 400 are adjusted according to the control command signals through the signal control center CPU 353 and the set master DMX output connectors 306 (FIG. 3B)

Figure 5:
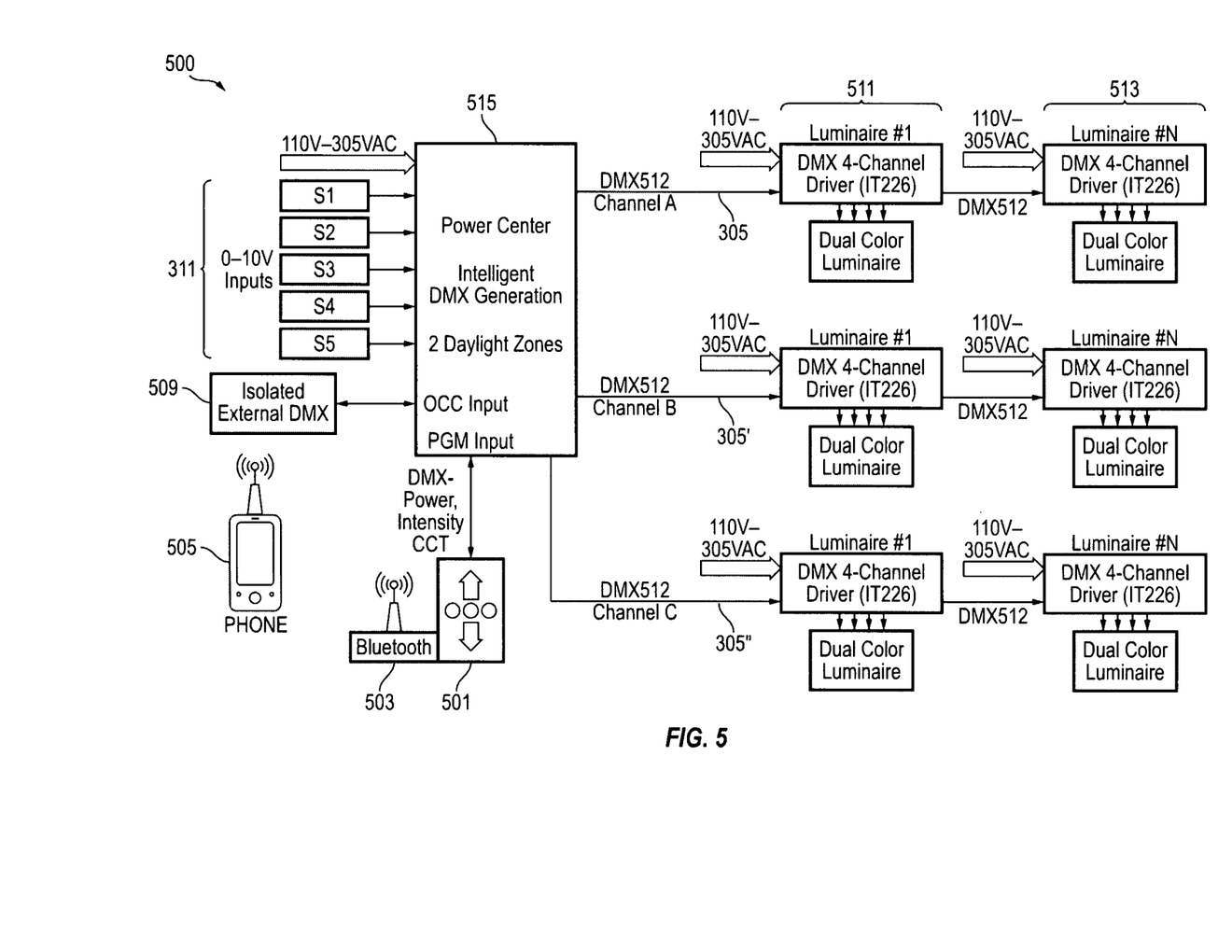
FIG. 5 shows a schematic representation of an advanced control lighting system in accordance with a preferred embodiment of the invention.

FIG. 5 shows a schematic representation of an advanced control lighting system 500 in accordance with a preferred embodiment of the invention. The system in sets of LED light fixtures 513 and 513 connected to three master DMX output connectors 305, 305' and 305" (Channel A, Channel B and Channel C). Each of the LED light fixtures in the sets LED light fixtures 511 and 513 are dual color luminaires (meaning each have two sets of different white LEDs). The system includes a master control center 515 with sensors 311, a power control center 300 (FIG. 3A), the signal control center 350 (FIG. 3B) and user control interface 400 (FIG. 4) and an isolated eternal DMX 509. Other features and specifications of the advanced control lighting system 500, the master control center 515, the connections 305, 305' and 305" and the LED light fixtures 511 and 513 are provided in the co-pending U.S. provisional patent applications Ser. Nos. 62/122,621, 62/178,705 and 62/230,798 that are all incorporated herein by reference.

As described above, the master control center 515 preferably includes a Bluetooth module 503. The Bluetooth module 503 allows a Bluetooth enabled wireless remote control device 505, such a smart-phone, to provide control command signals to the system and control the sets of LED light fixtures 511 and 513 through one or more graphical control interfaces 501. Preferably, a user can selectively control output signals provided through connectors 305, 305' and 305" corresponding (Channel A, Channel B and Channel C) individually or independently.

Figure 6:
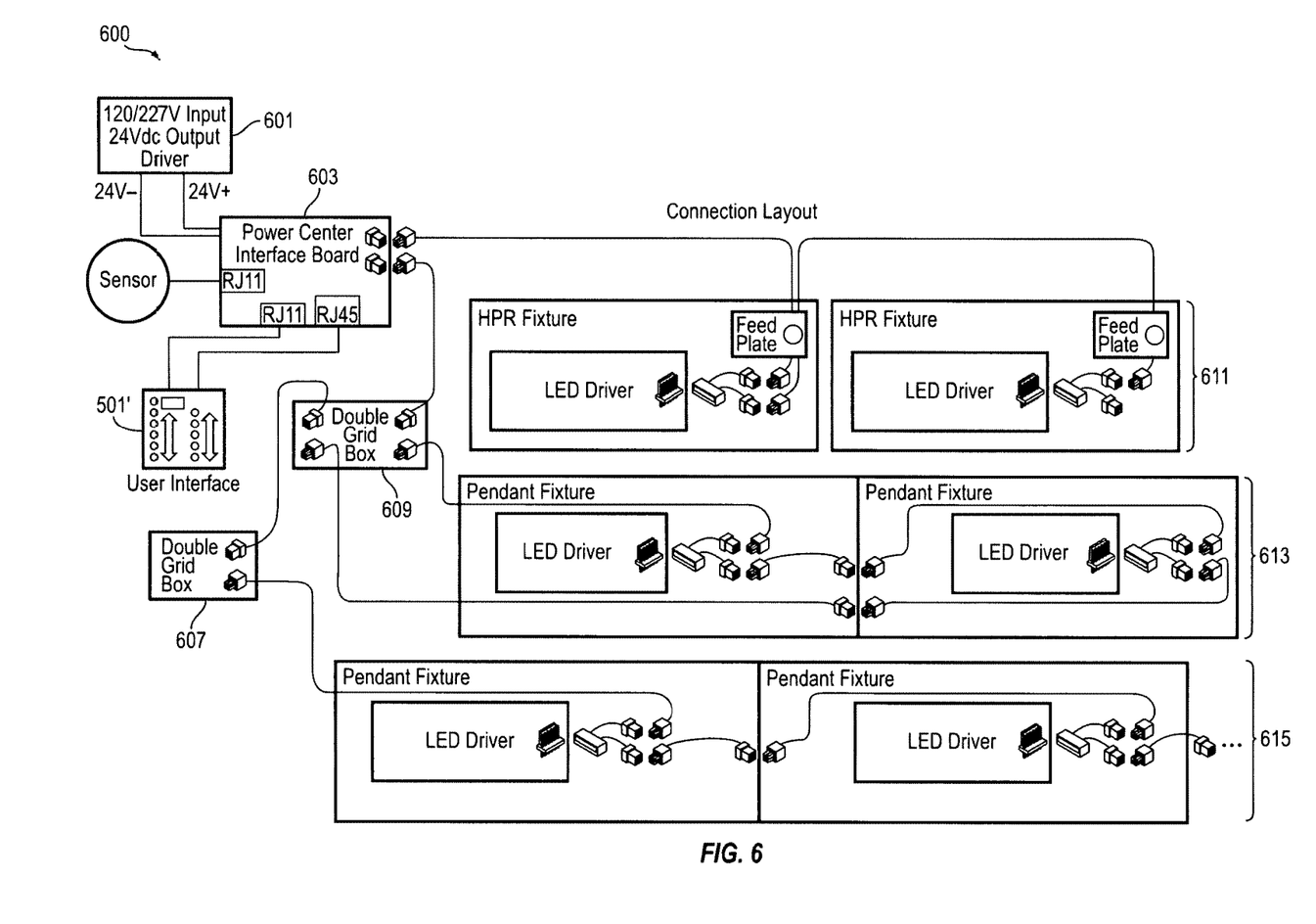
FIG. 6 shows a schematic representation of a connection layout for an advanced control lighting system of the present invention.

FIG. 6 shows a schematic representation of a connection layout for the advanced control lighting system 600 of the present invention. In the system 600, sensors and a user interface 501' are electrically couple to a power center interface board 603 through RJ11 and RJ45 plugs. The Power center interface board 603 is electrically coupled to and input/output driver circuit 601. The sets of LED light fixtures 611, 613 and 615 are coupled to the power interface board 603 through double grid boxes 607 and 609. Preferably, the advanced control lighting system 600 is connected and assembled through two-part plug connectors, as shown, such that installing the system and maintaining the system 600 requires a minimized effort. Each of the LED light fixtures 611, 613 and 615 include LED arrays having different two or more corresponding color spectra $C_1$, $C_2$ and $C_3$. The LED arrays are mounted on modular light boards that have matched connectors that detachably and interchangeably couple to the connectors on the master circuit board, such as described with reference to FIG. 1A. Also, the LED arrays can be mounted in light fixtures, such as described with reference to FIG. 1D, to provide upward and downward lighting and can include controls for independent upward and downward dimming control.

Figure 7A:
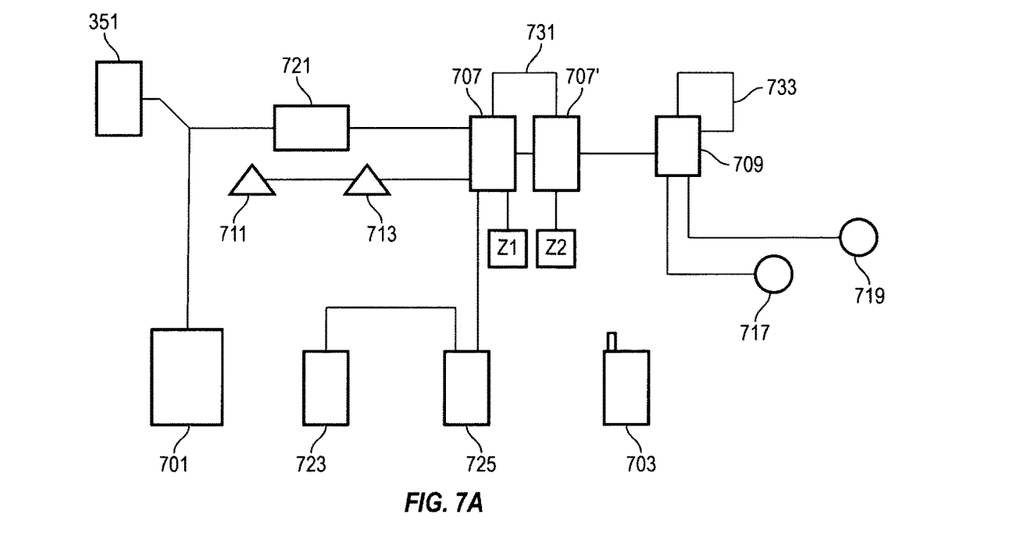
FIG. 7A shows a schematic representation of a connection layout or wiring diagram for a two-layer or two-zone lighting system with day light control, in accordance with the embodiments of the invention.

Referring to FIG. 7A, a lighting system 700 of the present invention has any number of layers or zones with or without daylight control. The lighting system 700 shown has two layers or zones. In this example, the lighting system 700 is constructed with occupancy sensors 711 and 713. The occupancy sensors 711 and 713 are connected control unit layer packs 707 and 707', hereafter layer packs. The system also includes daylight sensors 717 and 719 that are connected to a daylight sensor pack 709. The layer pack 707 is connected to lights and control lighting in zone 1 (Z1) and the layer pack 707' is connected to lights and controls lighting in zone 2 (Z2). The lights in zone 1 and the lights in zone 2 are also controlled through master switches 723 and 725. Power to the lights in zone 1 and zone 2 and power to the layer packs 707 and 707' is provided through a junction box connection 731 and power to the daylight sensor pack is provided through another junction box connection 733. The lighting system 700 also preferably includes a user interface, such as the user interfaces described above with referred to in FIGS. 2A-B. The lighting system 700 communicates input data signals, mode of operation signals, output signals and any other necessary data over a system bus, represented by 721. Elements or devices within the lighting system 700 can be connected by any suitable wiring system, such as CAT-5 cables, where signals are transmitted via DMX over the system bus 721.

In wiring a lighting system, such as the lighting system 700, the number of independently operable lighting zones is determined. A unique layer pack, such as 707 or 707', is assigned for each independently operable lighting zone. The lighting system is constructed with or without daylight sensors, such as 717 and 719. Other elements or devices of the lighting system, including the occupancy sensors 711 and 713, the master switches 723 and 725, the user interface 701 and the daylight sensor pack 709 (if daylight sensors 771 and 719 are used) are connected with suitable wires or cables, such as CAT-5 cables. Each of the elements or devices within the lighting system can be configured to receive plug-in cables, such that switching out elements of devices with the lighting system or modifying the lighting system only requires the new elements of devices to be plugged in or unplugged. As described above, each of the lighting zones within the system has an assigned layer pack is capable of being independently controlled through the user interface 701, through the maters switches 723 and 725 or through a remote computer 351 and a wireless device 703, such as described below.

The lighting system 700 of the present invention includes blue-tooth capabilities (blue-tooth transmitters and/or blue-tooth receivers). The lighting system 700 is capable of being programmed or commissioned by software running from a blue-tooth enabled device 703, such as a smart phone. Programming or commissioning the lighting system 700 with lighting protocols such as loading scheduled lighting protocols, implementing demand control protocols (reduce light output at peak power usage time) and emergency lighting response protocols, to name a few. The lighting system 700 of the present invention also is configured to transmit lighting history, usage analytics and/or operational parameters via blue-tooth to the blue-tooth enabled device 703 or to the remote computer 351 that is in communication with the lighting system 700 over the system bus 721 or wirelessly. The lighting system 700 can also be programmed or commissioned via the remote computer 351 either by wireless communication protocols or a system bus 721 connection.

Figure 7B:
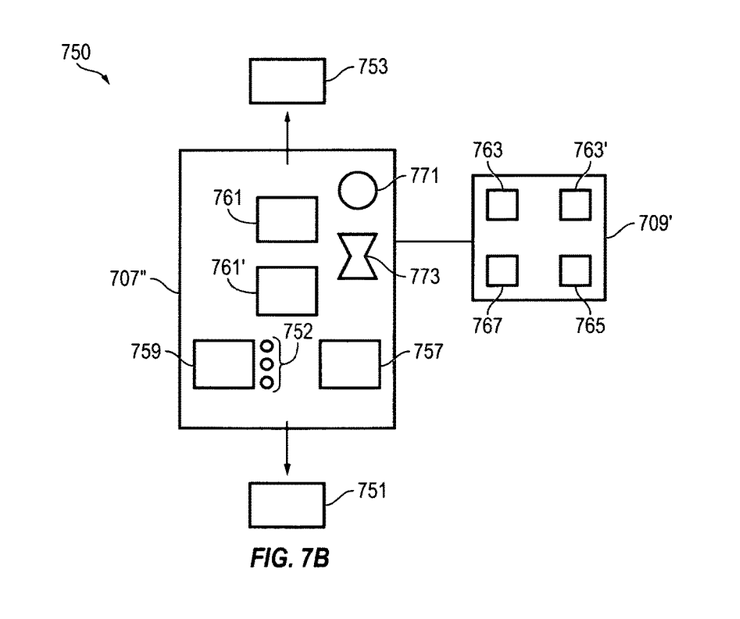
FIG. 7B shows a schematic representation of layer pack that controls zone lighting, in accordance with the embodiments of the invention.

Referring to FIG. 7B, a control unit 750 of the lighting system 700 described above, includes a layer pack 707", such as the layer packs 707 and 707'. The layer-pack 707" has built in intelligence 771 (a processor, memory and software; CPU) and communication hardware 773 (a wireless transducer) that allows the lighting system 700 to be programmed or commissioned with all of the features mentioned above by the wireless blue-tooth enabled device 703 or by the remote computer 351 (FIG. 7A). The layer pack 707" include connections to couple to a zone of light fixtures 751 and connection to couple to junction box connection 753. The layer pack 700" also has bus ports 761 and 761' to connect the layer pack 707" to the system bus 721 and other networked system elements or devices within the lighting system 700. The layer pack 707" also has a port 759 to connect to an occupancy sensor, such as the occupancy sensors 711 and/or 713 and a port for connecting to a master switch, such as the master switches 723 and/or 725. The control unit can also include a daylight sensor pack 709', such as the daylight sensor pack 709, that connects to the layer pack through one of the bus ports 761 and 761'. The daylight sensor pack 709' includes bus ports for connecting to the layer pack 707" and/or the system bus 721 and daylight sensor ports 765 and 767 for connecting to daylight sensors, such as the daylight sensor 717 and 719.

A lighting system 700 of the present invention can include and number of control units that operate independently or collectively. Preferably, each of the lighting zones withing the lighting system 700 are independently controllable through a common system user interface 701, over the system bus 721 and through the layer-packs 707 and 707'. As described above control units or layer packs and daylight sensor packs can be connected to the rest of the lighting system through plug-in cables, such as CAT-5 cables or other lower voltage cables. Preferably, layer packs, such as the layer pack 707", includes one or more control switches 752 that allow devices connected to one or more of the ports 757, 759, 761 and 761' to be enabled, disabled and/or change a mode of operation of the devices connected to one or more of the ports 757, 759, 761 and 761'.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A lighting system comprising zones, each zone comprising:
   a) light fixtures comprising light boards with the arrays of light emitting diodes connected through connectors, wherein arrays of light emitting diodes include 20 or more light emitting diodes and, wherein the light emitting diodes use 0.2 watts or less of electrical power; and
   b) a control unit connected to the one or more light fixtures for powering the one or more light fixture, the control unit comprising a layer pack with a processor, memory and software that executes lighting protocols, wherein each of the zones is independently controllable through a common system user interface.

2. The lighting system of claim 1, wherein further comprising one or more occupancy sensors.

3. The lighting system of claim 1, further comprising one or more daylight sensors.

4. The lighting system of claim 3, further comprising a daylight sensor pack for connecting the one or more daylight sensor to the layer pack.

5. The lighting system of claim 1, wherein the layer pack further comprises a blue-tooth receiver for receiving the lighting protocol from a wireless blue-tooth enables device.

6. A lighting system comprising:
   I) a first lighting zone comprising:
      a) a first set of LED light fixtures, each comprising at least two different sets of LED arrays mounted to modular light boards that emit different output spectra that include a component of white light, wherein the different output spectra combine to produce a combined output light intensity and a combined output light color temperature; and
      b) a first layer pack with a processor, memory and software that executes lighting protocols for the first set of LED light fixtures; and
   II) a second lighting zone comprising:
      a) a second set of LED light fixtures, each comprising at least two different sets of LED arrays mounted to modular light boards that emit different output spectra that include a component of white light, wherein the different output spectra combine to produce a combined output light intensity and a combined output light color temperature; and
      b) second layer pack with a processor, memory and software that executes lighting protocols for the second set of LED light fixtures, wherein the combined output light intensity and the combined output light color temperature from each of the first and second zone is independently controllable.

7. The lighting system of claim 6, further comprising one or more occupancy sensors for controlling a portion of the first set of LED light fixtures or a portion of the second set of LED light fixtures in response to detected occupancy.

8. The lighting system of claim 6, further one or more daylight sensors for controlling a portion of the first set of LED light fixtures or a portion of the second set of LED light fixtures in response to detected ambient light.

9. The lighting system of claim 6, wherein the first layer pack and the second layer pack are connected together over system bus and wherein a user interface is connected to the bus for independently control the combined output light intensity and the combined output light color temperature from each of the first and second zone.

10. A lighting system comprising:
    a) lighting zones, each with one or more LED light fixtures, each comprising at least two different sets of LED arrays mounted to modular light boards that emit different output spectra that include a component of white light, wherein the different output spectra combine to produce a combined output light intensity and a combined output light color temperature and wherein each of the LED light fixtures has connectors that detachably and interchangeably couple to matched connectors on the master circuit board;
    b) a layer pack control unit coupled to the master circuit board for controlling power to the one or more LED light fixtures and control the combined output light intensity and the output light color temperature to correspond to input intensity and input color temperature values selected;
    c) one or more system user interfaces coupled to layer pack control unit for selecting the combined output light intensity and a combined output light color temperature values from each of the lighting zones independently.

11. The lighting system of claim 10, further comprising sensors coupled to the layer pack control unit for automatically adjusting one or more of the combined output light intensity and the combined output light color temperature based on a measured or detected condition to maintain the input intensity and input color temperature selected.

12. The lighting system of claim 11, wherein the sensors include daylight sensors and the measured or detected condition is ambient light.

13. The lighting system of claim 11, wherein the sensors include a white light sensor and wherein the measured or detected condition is an amount of white light in ambient light.

14. The lighting system of claim 11, wherein the sensors include a occupancy sensor and wherein the measured or detected condition is the presence of an occupant in a vicinity of the one or more LED light fixtures.

15. The lighting system of claim 10, wherein the one or more system user interfaces include a touch screen device that displays movable intersecting cross-hairs, wherein positions of the intersecting cross-hairs on the touch screen device correspond to the input intensity and input color temperature values selected.

* * * * *